United States Patent
Sato et al.

(10) Patent No.: US 11,161,970 B2
(45) Date of Patent: Nov. 2, 2021

(54) SAPONIFIED ETHYLENE-VINYL ESTER-BASED COPOLYMER COMPOSITION AND PRODUCING METHOD THEREFOR

(71) Applicant: THE NIPPON SYNTHETIC CHEMICAL INDUSTRY CO., LTD., Osaka (JP)

(72) Inventors: Nobuaki Sato, Osaka (JP); Taiji Kanda, Osaka (JP); Ayano Nakashima, Osaka (JP)

(73) Assignee: MITSUBISHI CHEMICAL CORPORATION, Tokyo (JP)

( * ) Notice: Subject to any disclaimer, the term of this patent is extended or adjusted under 35 U.S.C. 154(b) by 0 days.

(21) Appl. No.: 16/065,457

(22) PCT Filed: Dec. 16, 2016

(86) PCT No.: PCT/JP2016/087551
§ 371 (c)(1),
(2) Date: Jun. 22, 2018

(87) PCT Pub. No.: WO2017/110676
PCT Pub. Date: Jun. 29, 2017

(65) Prior Publication Data
US 2018/0371229 A1 Dec. 27, 2018

(30) Foreign Application Priority Data

Dec. 25, 2015 (JP) .............. JP2015-254264

(51) Int. Cl.
*C08L 29/04* (2006.01)
*C08K 3/38* (2006.01)
*C08K 5/098* (2006.01)

(52) U.S. Cl.
CPC .......... *C08L 29/04* (2013.01); *C08K 3/38* (2013.01); *C08K 5/098* (2013.01); *C08K 2003/387* (2013.01)

(58) Field of Classification Search
CPC ...... C08L 29/04; C09D 129/04; C09J 129/04; C08J 2329/04; C08K 3/38; C08K 5/098; C08K 3/105; C08K 2003/387
See application file for complete search history.

(56) References Cited

U.S. PATENT DOCUMENTS 6,174,949 B1 * 1/2001 Ninomiya ............... B32B 27/32
524/404
6,485,842 B1 11/2002 Shindome et al.
(Continued)

FOREIGN PATENT DOCUMENTS

JP   H10-067898 A   3/1998
JP   2000-044756 A   2/2000
(Continued)

OTHER PUBLICATIONS

Ball et al., "Boron," Patty's Toxicology, 6th ed., John Wiley & Sons, 2012, pp. 885-890.*
(Continued)

Primary Examiner — Kregg T Brooks
(74) Attorney, Agent, or Firm — Greenblum & Bernstein, P.L.C.

(57) ABSTRACT

The purpose of the present invention is to provide: an EVOH resin-based composition (pellet) which has a desired melt viscosity without increasing the boron content, thereby being effective for surging prevention; and a method for producing the resin composition. The EVOH-based resin composition contains a boric acid compound and the boric acid compound contains tetracoordinated boron. An EVOH-based resin paste containing a boric acid compounds is brought into contact with an aqueous solution containing a
(Continued)

(A)

(B)

boric acid compound and alkali metal salt at an elevated temperature and an elevated pressure so that the amount of alkali metal salt is from 300 to 1000 ppm based on the EVOH-based resin paste, thereby converting the boron of the boric acid compound to tetracoordinated structure.

18 Claims, 3 Drawing Sheets

(56) References Cited

U.S. PATENT DOCUMENTS

| | | | |
|---|---|---|---|
| 2003/0060550 A1 | 3/2003 | Inomata et al. | |
| 2012/0172564 A1 | 7/2012 | Fujimura et al. | |
| 2013/0131270 A1* | 5/2013 | Shibutani | C08L 29/04 525/69 |

FOREIGN PATENT DOCUMENTS

| | | |
|---|---|---|
| JP | 2001-72823 A | 3/2001 |
| JP | 2001-146539 A | 5/2001 |
| JP | 2001-164059 A | 6/2001 |
| JP | 2011-099050 A | 5/2011 |
| JP | S62-3866 A | 1/2018 |
| TW | 201127858 A1 | 8/2011 |

OTHER PUBLICATIONS

International Search Report issued with respect to Patent Application No. PCT/JP2016/087551, dated Feb. 28, 2017.
International Preliminary Report on Patentability issued with respect to Patent Application No. PCT/JP2016/087551, dated Jun. 26, 2018.
Supplementary European Search Report dated Jul. 10, 2019 in corresponding European Application No. 16878565.7.
Steve W. Sinton, "Complexation chemistry of sodium borate with poly(vinyl alcohol) and small diols: a boron-11 NMR study," Macromolecules, (1987), vol. 20, No. 10, pp. 2430-2441.
First Office Action issued in CN Patent App. No. 201680076000.7 dated May 9, 2020, English translation.
Notification of Reasons for Refusal issued in JP Pat. App. No. 2017-501732 dated Jul. 15, 2020, English translation.
Communication under Article 94(3) EPC issued in EP Pat. App. No. 16 878 565.7 dated Sep. 4, 2020, English translation.
$2^{nd}$ Office Action issued in CN Patent App. No. 201680076000.7, dated Feb. 23, 2021, English translation.
Notification of Examination Opinions issued in TW Patent App. No. 105142147, dated Nov. 16, 2020, English translation.

\* cited by examiner

[FIG. 1]
(A)
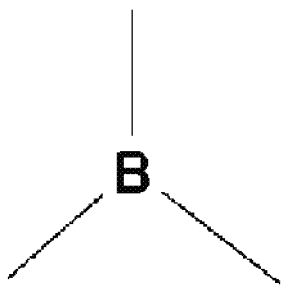
(B)
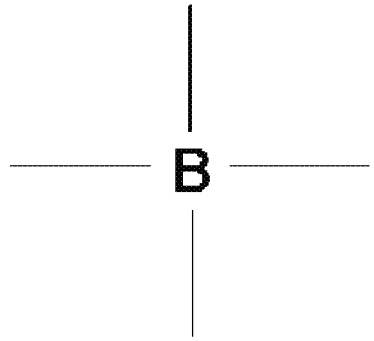

[FIG.2]

```
Preparation of EVOH-based resin hydrous paste (I):
Substitution of alcohol in alcohol solution of EVOH-based
resin with water
```

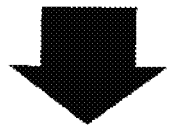

```
Preparation of boric acid compound-containing EVOH-based
resin paste (II):
Treatment for containing
boric acid compound and alkali metal salt
(preadjustment of concentrations of boric acid compound
and alkali metal salt)
```

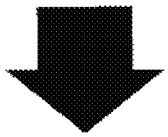

```
Tetracoordination treatment:
Treatment for contacting boric acid compound-containing
EVOH-based resin paste (II) with solution containing
boric acid compound and alkali metal salt
(adjustmemt of concetrations boric aciod cmopound
and alkali metal salt)
```

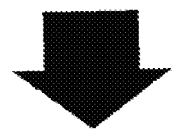

```
Tetracoordinated boron-containing
EVOH-based resin paste (III)
```

[FIG.3]
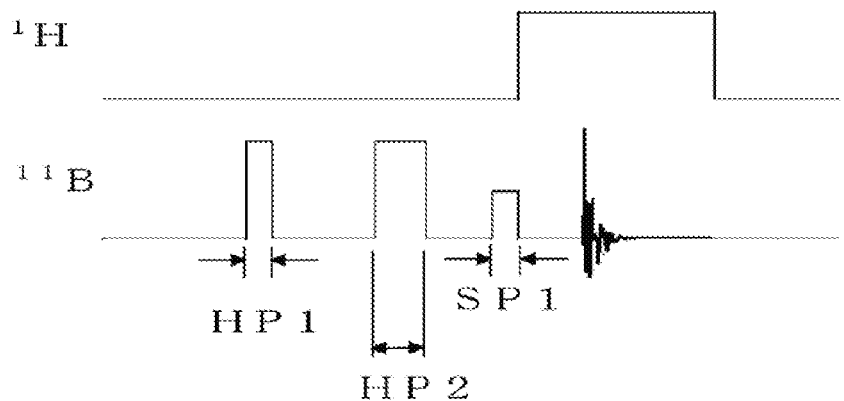
[FIG.4]
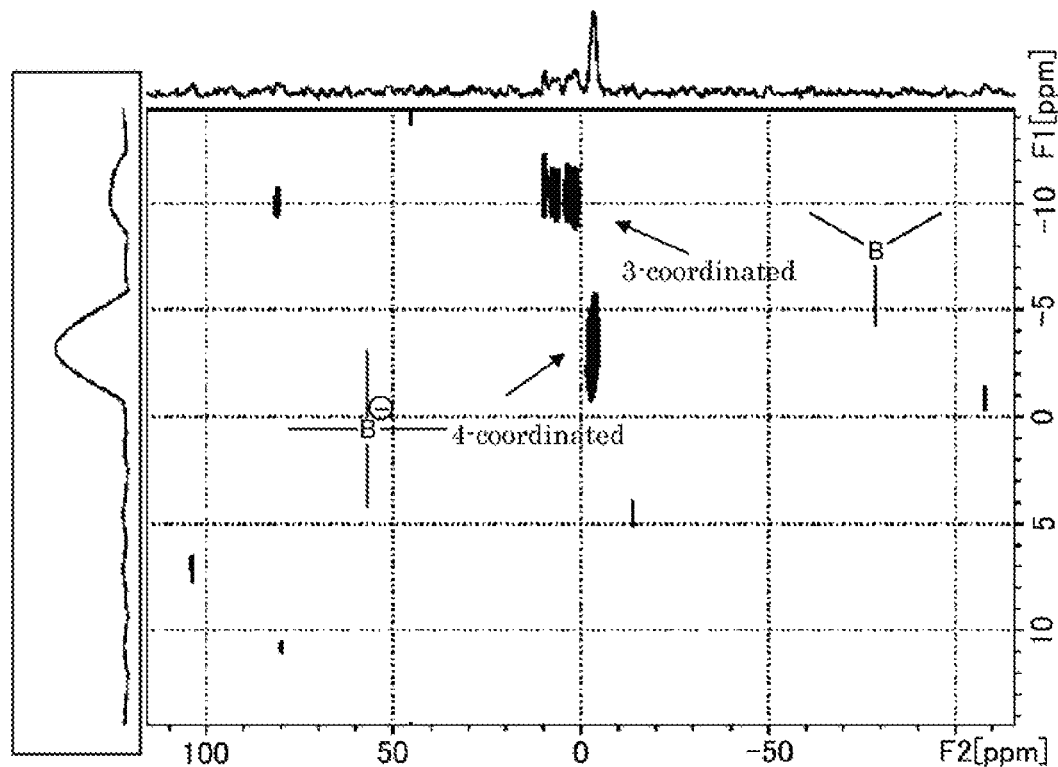

SAPONIFIED ETHYLENE-VINYL ESTER-BASED COPOLYMER COMPOSITION AND PRODUCING METHOD THEREFOR

TECHNICAL FIELD

The present invention relates to a saponified ethylene-vinyl ester-based copolymer (EVOH-based resin) composition having an increased tensile viscosity with a reduced boron content, in particular, relates to an EVOH-based resin composition exhibiting excellent mold processability and a producing method therefor.

BACKGROUND ART

EVOH-based resin can exhibit superior excellent gas-barrier performance such as oxygen-barrier performance due to the fact that hydrogen bond is formed between hydroxyl groups in the molecular chain of the EVOH resin to form a crystal part which can prevent oxygen from intruding thereinto. For this gas barrier performance, EVOH-based resin is molded into a film or sheet used as a wrapping material for food, pharmaceuticals, industrial medicine and agrochemicals, or a container such as bottle.

In general, molding EVOH resin into film, sheet, bottle, cup, tube, or pipe is carried out by melt-molding. The resulting molded article is processed for actual use. Therefore moldability and processability are important properties for EVOH-based resin.

Addition of boric acid compound to an EVOH-based resin may effect an increase in melt viscosity. The patent document 1 explained that employing, for a material for melt-molding, a resin composition in which a boric acid compound is added is effective for improving its melt-molding property, in particular, effective for suppressing surging in film formation.

However, it was proved that if the amount of boric acid compound to be added is too high or if boric acid compound is localized, fish eyes occur, which causes to lower a quality of the molded product.

The patent document 2 suggests a method of adjusting an amount of boric acid compound. The method comprises allowing boric acid compound to be contained in EVOH resin by immersing EVOH-based resin pellet into an aqueous solution of boric acid, and thereafter adjusting the water content to 0.001 to 2 wt % by drying the EVOH resin pellet, followed by rinsing to decrease the amount of the boric acid.

Table 1 in Example of the patent document 2 shows that a pellet which is subjected to rinsing treatment with water can be suppressed in the occurrence of fish eyes comparing to a pellet without the rinsing treatment.

[Patent document 1] JPsho62-3866B
[Patent document 2] JP2000-44756A

DISCLOSURE OF THE INVENTION

Technical Problem to be Solved by the Invention

If the pellet after drying is washed with water, another drying operation is needed because the pellet absorbs water in the rinsing treatment. A repeat of water absorption and drying sometimes causes coloration of the resin due to heat history. On the other hand, fewer operations of rinsing and drying are more preferred because of economic efficiency in production.

The present invention has been made under the situation, and the purpose of the invention is to provide an EVOH-based resin composition (pellet) which has been made to have a desired melt viscosity without heightening the boron content and which is hence effective for surging prevention; and a method for producing the composition.

Means for Solving the Problems

The melt viscosity of EVOH-based resin is increased by containing boric acid compound. This mechanism is supposed that the boric acid compound acts as a crosslinking agent to link polymeric chains by forming hydrogen bond or covalent bond between boron and hydroxyl group of EVOH-based resin.

Crosslink with boron is classified into tricoordination (planar tricoordinated structure) and tetracoordination (tetrahedrally coordinated structure) as shown in FIG. 1.

The inventors have studied hard about an EVOH-based resin composition containing a boric acid compound, and concluded that the presence of boron having tetracoordinated structure is effective for increasing the viscosity of the EVOH-based resin. A boric acid compound is usually present in a state of tricoordinated structure in a resin composition. However, the inventors found a method of converting tricoordinated boron to tetracoordinated boron, and have completed the invention.

The resin composition of the present invention comprises a saponified ethylene-vinyl ester-based copolymer and a boric acid compound, wherein the boric acid compound contains tetracoordinated boron.

The amount of the boric acid compound is preferably in the range of 1 to 350 ppm in terms of boron based on the saponified ethylene-vinyl ester-based copolymer. Also a percentage of the tetracoordinated boron in the boric acid compound is preferably from 10 to 99% by mol based on the boric acid compound.

The resin composition of the invention preferably contains 300 to 1000 ppm of an alkali metal salt in terms of metal per the saponified ethylene-vinyl ester-based copolymer. A preferable alkali metal salt is a sodium salt.

A preferable amount of the alkali metal salt per the boric acid compound is an amount such that a ratio in weight of alkali metal salt in terms of alkali metal to the boric acid compound in terms of boron is from 0.8 to 10.

A tensile viscosity at a tensile strain rate of 100 sec$^{-1}$ at 210° C. is preferable in the range of $1.0 \times 10^2$ to $1.0 \times 10^6$ Pa·s.

A producing method for an EVOH-based resin composition of the invention is a producing method of a saponified ethylene-vinyl ester-based copolymer composition containing tetracoordinated boron. The method comprises contacting a boric acid compound-containing saponified ethylene-vinyl ester-based copolymer paste with an aqueous solution containing a boric acid compound and an alkali metal salt under an elevated temperature and pressure condition to convert at least a part of boron in the boric acid compound contained in the paste to tetracoordinated boron, wherein the aqueous solution is an aqueous solution containing a boric acid compound and an alkali metal salt at respective content such that the content of the boric acid compound is from 1 to 350 ppm in terms of boron per saponified ethylene-vinyl ester-based copolymer in the saponified ethylene-vinyl ester-based copolymer composition and the content of alkali metal salt is from 300 to 1000 ppm in terms of metal per saponified ethylene-vinyl ester-based copolymer in the saponified ethylene-vinyl ester-based copolymer composition.

The elevated temperature is preferably, as a temperature in a system where the conversion process is carried out, in a range of 50 to 150° C., and an elevated pressure is preferably, as a difference between a pressure in the system and air pressure, in the range of 0.01 to 1 MPaG.

The contact is preferably carried out with kneading the saponified ethylene-vinyl ester-based copolymer paste with the aqueous solution.

The saponified ethylene-vinyl ester-based copolymer paste preferably contains 1 to 350 ppm of the boric acid or a metal salt thereof in terms of boron per the saponified ethylene-vinyl ester-based copolymer, and contains 1000 to 4000 ppm of the alkali metal salt in terms of metal per the saponified ethylene-vinyl ester-based copolymer.

Moreover, the aqueous solution preferably contains the boric acid compound in a concentration of 1 to 50 ppm in terms of boron, and contains the alkali metal salt in a concentration of 50 to 1500 ppm in terms of metal.

Effect of the Invention

Since the EVOH-based resin composition contains tetra-coordinated boron, the EVOH-based resin exhibits superior melt-molding property despite of a relatively reduced amount of boric acid compound contained therein.

Carrying out of the inventive method for producing EVOH-based resin composition may be possible by altering a composition of a treatment liquid used for treating EVOH-based resin paste in a conventional method for producing a resin composition, which is an advantage in the production.

BRIEF DESCRIPTION OF THE DRAWINGS

FIG. 1 illustrates coordinated structures of boron.
FIG. 2 is a scheme depicting an embodiment of producing method of the invention.
FIG. 3 is a drawing depicting a pulse sequence for measuring boron nucleus.
FIG. 4 is a MQMAS (3QMAS) spectrum of boron nucleus.

MODE FOR CARRYING OUT OF THE INVENTION

Hereinafter, the present invention will be described, however the description shows merely one preferable embodiment and does not restrict the content of the invention.
[EVOH-Based Resin Composition]
(1) EVOH-Based Resin EVOH-based resin used in the disclosure is a water-insoluble thermoplastic resin and usually produced by saponifying a copolymer of ethylene and vinyl ester-based monomer, so-called ethylene-vinyl ester-based copolymer. Copolymerization of the above monomers may be conducted by a known polymerization method, for example, solution polymerization, suspension polymerization, or emulsion polymerization. In general, solution polymerization with use of a lower alcohol such as methanol, preferably methanol as a solvent, is employed. Saponification of the produced ethylene-vinyl ester-based copolymer may be conducted by a known method.

Thus produced EVOH-based resin contains ethylene-derived structural unit and vinyl alcohol structural unit both as main structural units, and in some cases, also contains a slight amount of vinyl ester structural unit which exists as an unsaponified unit.

As the vinyl ester-based monomer, vinyl acetate is employed as a typical vinyl ester-based monomer from the viewpoint of commercial availability and efficiency of removing impurities generated in production. Employed may be other vinyl ester-based monomer, for example, aliphatic vinyl esters such as vinyl formate, vinyl propionate, vinyl valerate, vinyl butyrate, vinyl isobutyrate, vinyl pivalate, vinyl caprate, vinyl laurate, vinyl stearate, and vinyl versatate, as well as aromatic vinyl esters such as vinyl benzoate. Commonly used is an aliphatic vinyl ester having from usually 3 to 20 carbon atoms, preferably 4 to 10 carbon atoms, particularly preferably 4 to 7 carbon atoms. These vinyl ester-based monomers may be used individually or in a combination thereof according to needs.

Copolymerization of ethylene and vinyl ester-based monomer may be conducted by a known polymerization method including solution polymerization, suspension polymerization, and emulsion polymerization.

The solvents employed for the copolymerization are a lower alcohol such as methanol, ethanol, propanol, and butanol; a ketone such as methyl ethyl ketone, and so on. Methanol is preferably employed in industry.

Also saponification of the produced ethylene-vinyl ester-based copolymer may be conducted by a known method.

Examples of catalysts used for the saponification include alkaline catalysts such as sodium hydroxide, potassium hydroxide, and a like alkali metal hydroxide, or sodium methylate, sodium ethylate, potassium methylate, lithium methylate, and a like alcoholate of alkali metal; acidic catalysts such as sulfuric acid, chloric acid, nitric acid, and methanesulfonic acid; zeolite and cationic exchange resin.

The content of ethylene-derived unit in the EVOH-based resin is in the range of usually 20 to 60 mol %, preferably 25 to 50 mol %, particularly preferably 25 to 45 mol %, as a measurement value in accordance with ISO14663. If the content of ethylene-derived unit is unduly low, the gas-barrier performance under a high humidity condition and melt-molding property tends to be lowered. If the content of ethylene-derived unit is unduly high, gas-barrier performance might be impaired.

The saponification degree of the vinyl ester unit in the EVOH-based resin is in the range of usually 90 to 100 mol %, preferably 95 to 100 mol %, particularly preferably 99 to 100 mol %, as a measurement value in accordance with JIS K6726 with the proviso that a mixture of water and methanol is used as a solvent. If the saponification degree is unduly low, the gas-barrier performance, thermostability and humidity resistance tend to be lowered.

Melt flow rate (MFR) of the EVOH-based resin at 210° C. under a load of 2,160 g is usually 0.5 to 100 g/10 minutes, preferably 1 to 50 g/10 minutes, particularly preferably 3 to 35 g/10 minutes. EVOH-based resin having unduly high MFR tends to become unstable in film formation. EVOH-based resin having unduly low MFR tends to have an increased viscosity, resulting in being difficult in melt-extruding operation.

EVOH-based resin used in the disclosure may contain a structural unit derived from the following comonomer in an amount within the range not inhibiting the effect of the invention, for example, 10 mol % or less.

Examples of the comonomer include olefins such as propylene, 1-butene and isobutene; hydroxyl group-containing α-olefins such as 3-buten-1-ol, 3-butene-1,2-diol, 4-penten-1-ol, and 5-hexene-1,2-diol, or a derivative such as ester thereof and acrylate product; hydroxyalkyl vinylidenes such as 2-methylene propane-1,3-diol, and 3-methylene pentane-1,5-diol; hydroxyalkyl vinylidene diacetate such as 1,3-diacetoxy-2-methylene propane, 1,3-dipropionyloxy-2-methylene propane, and 1,3-dibutyronyloxy-2-methylene propane; unsaturated acids such as acrylic acid, methacrylic acid, crotonic acid, phthalic acid (or anhydride), maleic acid (or anhydride), itaconic acid (or anhydride) or salt thereof, or mono- or di-alkyl ester having from 1 to 18 carbon atoms in the alkyl group; acrylamides such as acrylamide, N-alkyl acrylamide having from 1 to 18 carbon atoms in the alkyl group, N,N-dimethylacrylamide, 2-acrylamide propane-sulfonic acid or salt thereof, and acrylamide propyl dimethylamine or salt thereof or quaternary salt thereof methacrylamides such as methacrylamide, N-alkylmethacrylamide having from 1 to 18 carbon atoms in the alkyl group, N,N-dimethylmethacrylamide, 2-methacrylamide propane-sulfonic acid or salt thereof, and methacrylamide propyl dimethylamine or salt thereof or quaternary salt thereof; N-vinylamides such as N-vinylpyrrolidone, N-vinylformamide, and N-vinylacetamide; vinyl cyanides such as acrylonitrile and methacrylonitrile; vinyl ethers such as alkyl vinyl ether, hydroxyalkyl vinyl ether, and alkoxyalkylvinyl ether having from 1 to 18 carbon atoms in respective alkyl group; vinyl halides such as vinyl chloride, vinylidene chloride, vinyl fluoride, vinylidene fluoride, and vinyl bromide; vinylsilanes such as trimethoxyvinylsilane; allyl halides such as allyl acetate and allyl chloride; allyl alcohols such as allyl alcohol and dimethoxy allyl alcohol; trimethyl-(3-acrylamide-3-dimethylpropyl)-ammonium chloride, acrylamide-2-methylpropanesulfonic acid and so on.

In addition, a post-modified EVOH-based resin by urethanation, acetalization, cyanoethylation, or oxyalkylenation may be used.

In particular, an EVOH-based resin containing hydroxyl group in a side chain thereof, inter alia a primary hydroxyl group in a side chain thereof, in particular EVOH-based resin having 1,2-diol in a side chain thereof is preferred from the viewpoint of formability in secondary forming. The EVOH-based resin having 1,2-diol in a side chain thereof has a structural unit containing 1,2-diol in a side chain thereof. The structural unit containing 1,2-diol in side chain is a structural unit shown in the general formula (1) below.

[Formula 1]

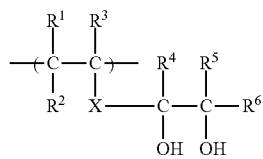

(1)

In the formula (1), $R^1$, $R^2$, and $R^3$ represent hydrogen atom or an organic group independently, and X represents single bond or a binding chain, and $R^4$, $R^5$, and $R^6$ represent hydrogen atom or an organic group independently.

Examples of the organic group in the 1,2-diol structural unit of the formula (1) include a saturated hydrocarbon group such as methyl, ethyl, n-propyl, isopropyl, n-butyl, isobutyl, and tert-butyl; aromatic hydrocarbon group such as phenyl and benzyl; halogen, hydroxyl, acyloxy, alkoxycarbonyl, carboxyl, sulfonic acid group, and so on.

$R^1$ to $R^3$ each is preferably a saturated hydrocarbon group having from usually 1 to 30 carbon atoms, preferably 1 to 15 carbon atoms, more preferably 1 to 4 carbon atoms, or hydrogen atom. Of these, hydrogen atom is most preferred. $R^4$ to $R^6$ each is preferably a saturated hydrocarbon group having from usually 1 to 30 carbon atoms, preferably 1 to 15 carbon atoms, more preferably 1 to 4 carbon atoms, or hydrogen atom. Of these, hydrogen atom is most preferred.

X in the structural unit of the formula (1) is typically single bond.

X may also be a binding chain as long as the effect of the invention is not inhibited. Non-limiting examples of the binding chain include hydrocarbon chain such as alkylene, alkenylene, alkynylene, phenylene, and naphthylene (wherein at least one hydrogen atom of these hydrocarbons may be substituted with halogen such as fluorine, chlorine, or bromine), as well as ether bond-containing group such as —O—, —(CH$_2$O)m—, —(OCH$_2$)m—, and —(CH$_2$O)mCH$_2$-; carbonyl group-containing chain such as —CO—, —COCO—, —CO(CH$_2$)mCO—, and —CO(C$_6$H$_4$)CO—; sulfur atom-containing group such as —S—, —CS—, —SO—, and —SO$_2$—; nitrogen atom-containing group such as —NR—, —CONR—, —NRCO—, —CSNR—, —NRCS—, and —NRNR—; hetero such as phosphorus atom-containing group such as —HPO$_4$—; silicon atom-containing group such as —Si(OR)$_2$—, —OSi(OR)$_2$—, and —OSi(OR)$_2$O—; titanium atom-containing group such as —Ti(OR)$_2$—. —OTi(OR)$_2$—, and —OTi(OR)$_2$O—; aluminum-containing group such as —Al(OR)—, —OAl(OR)—, and —OAl(OR)O—, wherein R is independently an optional substituting group, and preferably hydrogen atom or an alkyl group, m is a natural number selected from usually 1 to 30, preferably 1 to 15, particularly preferably 1 to 10; and a like metal-containing group. Among them, —CH$_2$OCH$_2$—, and hydrocarbon chain having from 1 to 10 carbon atoms, moreover 1 to 6 carbon atoms, especially one carbon atom, are preferred from the viewpoint of stability in production and usage.

The most preferable structure of 1,2-diol structural unit represented by the formula (1) is a structure where all $R^1$ to $R^6$ are hydrogen atoms and X is single bond, that is, the structural unit of the formula (1a) below.

[Formula 1a]

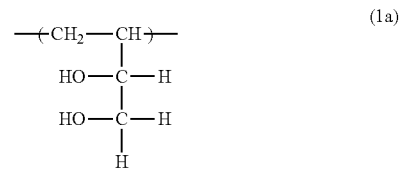

(1a)

In the case of containing 1,2-diol structural unit of the formula (1), the content of the structural unit is in the range of usually 0.1 to 20 mol %, preferably 0.1 to 15 mol %, particularly 0.1 to 10 mol %.

(2) Boric Acid Compound

The boron to be contained in EVOH resin composition is usually a boron of boric acid compound which is a boric acid or its salt. Examples of the boric acid salt include calcium borate, cobalt borate, zinc borate (e.g. zinc tetraborate, zinc metaborate), potassium aluminum borate, ammonium borate (e.g. ammonium metaborate, ammonium tetraborate, ammonium pentaborate, ammonium octaborate), cadmium borate (e.g. cadmium orthoborate, cadmium tetraborate), potassium borate (e.g. potassium metaborate, potassium tetraborate, potassium pentaborate, potassium hexaborate, potassium octaborate), silver borate (e.g. silver metaborate, silver tetraborate), copper borate (e.g. copper (II) borate, copper metaborate, copper tetraborate), sodium borate (e.g. sodium metaborate, sodium diborate, sodium tetraborate, sodium pentaborate, sodium hexaborate, sodium octaborate), lead borate (e.g. lead metaborate, lead hexaborate), nickel borate (e.g. nickel orthoborate, nickel diborate, nickel tetraborate, nickel octaborate), barium borate (e.g. barium orthoborate, barium metaborate, barium diborate, barium tetraborate), bismuth borate, magnesium borate (e.g. magnesium orthoborate, magnesium diborate, magnesium metaborate, trimagnesium tetraborate, pentamagnesium tetraborate), manganese borate (e.g. manganese (I) borate, manganese metaborate, manganese tetraborate), and lithium borate (e.g. lithium metaborate, lithium tetraborate, lithium pentaborate). Borate mineral such as borax, kainite, inyonite, kotoite, suanite, and szaibelyite may be included. Of these, borax, boric acid, and sodium borate such as sodium metaborate, sodium diborate, sodium tetraborate, sodium pentaborate, sodium hexaborate, and sodium octaborate are preferably used.

An amount of boric acid compound contained in the resin composition is preferably from 1 to 350 ppm, more preferably 10 to 330 ppm, further more preferably 30 to 300 ppm, particularly preferably 100 to 300 ppm, in terms of boron per EVOH-based resin.

Boric acid compound is added for improvement of moldability and prevention of surging of the resin composition. Unduly high amounts of boric acid compound contained in the resin composition causes the occurrence of fish eye due to the localization of crosslinked substance and so on. The resin composition of the invention has a feature such that its mold processability is excellent and the occurrence of fish eye is suppressed regardless that the inventive resin composition has a lower content of a boric acid compound than a conventional resin composition.

At least a part of the boric acid or salt thereof contained in the resin composition has tetracoordinated structure. A boric acid compound exists in a state of tricoordinated structure (FIG. 1(A)) or tetracoordinated structure (FIG. 1(B)) as shown in FIG. 1. The boric acid compound contained in a common EVOH-based resin exists in a state of tricoordinate structure, however, the boric acid compound contained in the resin composition of the invention includes a boron having tetracoordinated structure. The presence of the tetracoordinated boron contributes to increase tensile viscosity of the resin composition without altering the amount of boron contained in the resin composition. Accordingly increasing the percentage of tetracoordinated boron make it possible to reduce an amount of boric acid compound to an amount sufficient enough to achieve a desired tensile viscosity necessary for securing superior extrusion moldability. In other words, the resin composition has a tensile viscosity necessary for securing excellent moldability despite of a reduced amount of boric acid compound, and as a result, the occurrence of fish eye may be suppressed.

The content percentage of the tetracoordinated boron in the boric acid compound contained in the resin composition is preferably 10 mol % or more, more preferably 20 mol % or more, furthermore preferably 30 mol % or more, particularly preferably 50 mol % or more, wherein the content percentage is in terms of boron. Unduly low content percentage of the tetracoordinated boron might not obtain an effect of improving mold processability. A common upper limit of the content percentage is 99 mol %, preferably 95 mol % from the viewpoint of productivity. The content percentage can be determined by measuring boron nucleus with solid NMR, analyzing the obtained spectra of tricoordinated boron and tetracoordinated boron, and calculating according to the below equation based on the areas obtained from their spectra.

$$\text{percentage of tetracoordinated boron (mol\%)} = \frac{\text{Area of tetracoordinated boron}}{\text{Area of tricoordinated boron} + \text{Area of tetracoordinated boron}} \times 100 \quad \text{[Equation 1]}$$

In order that a boron exists as tetracoordinated boron, conversion of tricoordinated boron to tetracoordinated boron is needed. A method for converting tricoordinated boron to tetracoordinated boron is not particularly limited, however include, for instance, an inventive method described later. The inventive method, which is preferably employed as a method for the conversion, comprises a process of contacting a boric acid compound-containing EVOH-based resin composition with a treatment liquid under an elevated temperature and pressurized condition. This method is incorporated as a part of processes in manufacturing pellets, which is convenient and contributes to high productivity.

(3) Alkali Metal Salt

The resin composition of the invention preferably contains an alkali metal salt. While the alkali metal salt already contains in a conventional resin composition as a residue of the alkaline catalyst used in the saponification reaction or thermal stabilizer added. A boric acid compound is known familiarly as a crosslinking agent of EVOH-based resin. It was proved that the coordination structure of boron contained in the EVOH-based resin composition is also affected by a content ratio of the alkali metal which is contained in the EVOH-based resin composition. In a preferable embodiment, the resin composition contains an alkali metal salt at an amount sufficient enough for the boric acid compound to exist stably in a state of tetracoordinated boron in the resin composition. For this reason, in the case that alkaline catalyst is not used in the saponification or in (the case that heat stabilizer other than the alkali metal salt is used, an alkali metal salt is preferably added to the resin composition up to an intended concentration by a contact treatment, which is a process of the producing method of the resin composition as described later.

Examples of the alkali metal salt include an inorganic acid salt such as phosphate, hydrogenphosphate, dihydrogenphosphate, sulfate, sulfite, and carbonate; and organic acid salt such as acetate, stearate, propionate, butyrate, laurate, oleate, behenate, and the like salt of carboxylic acid having from 2 to 16 carbon atoms.

Among them, alkali metal salt of acetic acid is preferred because it is identical to by-product generated in the saponification process. A preferable metal of the salt is sodium and potassium, more preferable metal is sodium.

These metal salt may be used alone or in a combination of different kinds of metal salts. For example, in the case of sodium salt, sodium acetate, sodium propionate, sodium phosphate, sodium hydrogenphosphate, and a like sodium salt may be together contained. In the case of employing a combination, the sum of the amounts of the sodium salts contained in the resin composition is expressed as a sum of amounts in terms of sodium of the salts.

An amount of the alkali metal salt contained in EVOH-based resin composition is not limited to, but preferably 300 ppm or more, more preferably 300 to 1000 ppm, further more preferably 310 to 1000 ppm, particularly preferably 320 to 800 ppm, in terms of metal per the EVOH-based resin.

In the case that the alkali metal salt is sodium salt, the amount of sodium is not limited to, but preferably 300 ppm or more, more preferably 300 to 1000 ppm, furthermore preferably 310 to 1000 ppm, particularly preferably 320 to 800 ppm, in terms of sodium per the EVOH-based resin.

Crosslinked structure formed by a boric acid compound is sensitive to alkali metal such as sodium and potassium or alkaline earth metal such as calcium and magnesium. Among the metal salts, alkali metal which is strong basic is more effective for conversion to tetracoordinated boron. Sodium salt is particularly preferably used because of readily conversion to tetracoordinated boron.

Moreover, the content ratio of alkali metal salt in terms of alkali metal and boric acid compound in terms of boron is important in a stable existence as tetracoordinated boron. The ratio of content in weight of the alkali metal to the boron, i.e. (content of alkali metal salt in terms of alkali metal/content of boric acid compound in terms of boron), is preferably 0.8 to 10, more preferably 0.9 to 5, furthermore preferably 1.0 to 3.

(4) Other Ingredients

The resin composition in the disclosure may optionally contain an additive which is conventionally added to EVOH resin, within the range of the amount not inhibiting the effect, for example, 5 wt % or less.

Examples of the additives include heat stabilizer other than alkali metal salt, antioxidant, antistatic agent, colorant, ultraviolet absorber, lubricant, plasticizer, light stabilizer, surfactant, insecticide, drying agent, antiblocking agent, fire retardant, crosslinking agent, curing agent, blowing agent, crystal forming agent, anti-fogging agent, biodegradable agent, silane coupling agent, and oxygen scavenger.

Thus EVOH-based resin composition containing tetracoordinated boron has a higher tensile viscosity than a conventional EVOH-based resin composition which does not have a corresponding concentration of tetracoordinated boron in terms of boron despite of reduced amount of boric acid compound contained in the resin composition.

The tensile viscosity expresses a viscosity of resin melt with applying a strain at a constant strain rate and a constant temperature. The tensile viscosity predominates a flow behavior of the resin in a place where the flow rate of the resin is increased or decreased, such as a narrow gate of flow passage and a joining part of multilayers. Accordingly the tensile viscosity may be employed as an indicator for evaluating melt-molding property and processability of melt spinning, film formation, and blow molding. The higher the tensile viscosity is, the better the mold processability.

Concretely speaking, in the case that the amount of the boric acid compound per EVOH-based resin is in the range of 1 to 350 ppm in terms of boron, tensile viscosity at 210° C. under tensile strain rate of 100 sec-1 corresponding to a common tensile strain rate in film formation, may be controlled to the range of $1.0 \times 10^2$ to $1.0 \times 10^6$ Pa·s, preferably about $5.0 \times 10^2$ to about $5.0 \times 10^5$ Pa·s.

[Method for Producing Resin Composition]

The resin composition of the invention, which is an EVOH-based resin composition comprising tetracoordinated boron, may be prepared as described below.

The method for producing the inventive EVOH-based resin composition comprises a characteristic process that is a process of contacting a paste of EVOH-based resin composition containing a boric acid compound (hereinafter called as "boric acid compound-containing EVOH-based resin paste (II)") with an aqueous solution (treatment liquid) containing a boric acid compound and an alkali metal salt under elevated temperature and pressure condition, thereby converting at least a part of the boron of the boric acid compound contained in the paste to tetracoordinated boron. The process is, hereinafter sometimes called as "tetracoordination treatment". In the tetracoordination treatment process, the following conditions relates to the conversion to the tetracoordinated structure.

(1) a composition of EVOH-based resin paste prior to being subjected to the tetracoordination treatment is carried out;
(2) a temperature of EVOH-based resin paste prior to being subjected to the tetracoordination treatment;
(3) a composition of tetracoordination treatment liquid;
(4) a temperature of tetracoordination treatment liquid;
(5) an inner pressure in the container where tetracoordination treatment is carried out;
(6) a treating time of tetracoordination treatment;
(7) an amount of alkali metal contained in the EVOH-based resin paste after the tetracoordination treatment is carried out; or
(8) a combination of two or more of the (1) to (7)

Next, one embodiment of the inventive producing method will be described based on a scheme depicted in FIG. 2. The scheme shown in FIG. 2 is one embodiment including a characteristic process in the disclosure, but the producing method of the invention is not limited thereto.

The boric acid compound-containing EVOH-based resin paste (II) is prepared by a process of allowing EVOH-based resin hydrous paste (I) to contain the boric acid compound.

(1) Preparation of EVOH-Based Resin Hydrous Paste (I)

An EVOH-based resin hydrous paste (I) is a paste of EVOH-based resin or EVOH-based resin composition which is subjected to the treatment for containing the boric acid compound, and is discriminated from an EVOH-based resin paste to be subjected to the tetracoordination treatment.

The EVOH-based resin hydrous paste (I) is a soft and fluid hydrous EVOH-based resin composition usually containing water and alcohol, and exists in a state of rubber or jelly.

EVOH-based resin after saponification is usually discharged in a form of a solution in which alcohol or a mixture of water/alcohol is used as a solvent (hereinafter collectively called as "alcohol solution of EVOH-based resin" unless otherwise indicated) from the reaction system under an elevated temperature and pressure condition. The EVOH-based resin hydrous paste (I) having a reduced alcohol content may be prepared by substituting alcohol of the alcohol solution of EVOH-based resin obtained after saponification, with water.

The alcohol solution of EVOH-based resin obtained after saponification usually has a concentration of EVOH-based resin of 10 to 70 wt %, preferably 20 to 65 wt %, further preferably 30 to 60 wt %.

A residual monomer (vinyl ester-based monomer) which is remained in a process of synthesizing ethylene-vinyl ester copolymer is usually removed from the alcohol solution of EVOH-based resin used for preparing EVOH-based resin hydrous paste (I).

A part of carboxylic acid generated in the saponification is remained. Therefore in the case of using alkaline catalyst as a saponification catalyst, metal salt of carboxylic acid may be by-produced. For example, in the case that vinyl acetate as the vinyl ester and sodium hydroxide as the catalyst are used, sodium acetate as a by-product may be an alkali metal salt contained in the EVOH-based resin hydrous paste (I).

The amount of alkali metal salt which may be contained in the EVOH-based resin hydrous paste (I) is in the range of 1000 to 4000 ppm in terms of alkali metal per EVOH-based resin.

The operation of substituting alcohol with water (abbreviated by "alcohol/water substitution") is usually carried out by contacting an alcohol solution of EVOH-based resin with water or steam (hydration treatment).

A preferable temperature of water and steam used in the contact treatment is from usually 30 to 200° C., preferably 80 to 180° C., more preferably 100 to 150° C. In particular, steam is preferably introduced into the container from the viewpoint of substitution efficiency.

If the amount of the steam (or water) used in the contact treatment is too low, the efficiency of substitution with alcohol is insufficient. However, unduly high amount of the steam (or water) is disadvantage in cost. The amount of steam is usually from 0.01 to 30 times, preferably 0.1 to 10 times, more preferably 0.5 to 5 times of the amount to be introduced into the alcohol solution of EVOH-based resin, in weight ratio.

The contact treatment of alcohol solution of EVOH-based resin with water or steam can usually be carried out using a tower type container such as shelf plate tower (i.e. perforated plate tower or bubble-cap tower) and packed tower.

In the case of the shelf plate tower, the theoretical number of shelves is usually 2 to 20, preferably 5 to 15. In the case of the packed tower type, the quantity of filling material is determined according to the requirement. The alcohol solution of EVOH-based resin and steam and/or water are introduced into such a tower-type container, and a part of the alcohol in the EVOH-based resin solution is substituted with water by the contact between the alcohol solution and water, and as a result, a EVOH-based resin hydrous paste (I) is discharged.

The process of contacting the alcohol solution of EVOH-based resin with water or steam may be carried out in either counter flow or parallel flow. The contact in counter flow is preferably employed from the viewpoint of efficiency of substitution. Concretely speaking, it is desirable that the alcohol solution of EVOH-based resin is introduced from the upper part of the tower, the steam is introduced from the lower part of the tower to create counter flow-contact, alcohol vapor is led out together with the steam from the upper part of the tower, and the EVOH-based resin hydrous paste (I) is discharged from the lower part of the tower.

In addition to substituted alcohol, by-products of saponification together with the introduced water are partially discharged from the exhaust port, and in this way it is possible to reduce impurities that cause problems such as coloring of the EVOH-based resin and its molded article. Therefore, this hydration treatment has a role as a washing treatment of the EVOH-based resin.

The water content, the alcohol content, and the EVOH-based resin content in the EVOH-based resin hydrous paste (I) can be controlled by the amount of water (and/or steam) introduced to the container, the internal temperature, and internal pressure of the tower. Further, depending on the specifications of the tower-type container to be used, for example, the number of the shelves, the cross-sectional area and its ratio to the height of the tower, the number of the shelves, the pore diameter and the number of the perforated plate, the alcohol content and resin content in the alcohol solution of EVOH-based resin may be appropriately adjusted.

The pressure in the tower type container is not limited, but the pressure is set so that the difference between the pressure and atmospheric pressure is from preferably 0 to 0.5 MPaG, more preferably 0.1 to 0.3 MPaG. Unduly high pressurization tends to cause thermal deterioration of EVOH-based resin due to elevation of the temperature in the container.

Thus obtained EVOH-based resin hydrous paste (I) has an alcohol content of usually 10 to 200 parts by weight, preferably 20 to 150 parts by weight, more preferably 30 to 120 parts by weight based on 100 parts of EVOH-based resin. The proportion of EVOH-based resin in the EVOH-based resin hydrous paste (I) is in the range of usually 20 to 60 wt %, preferably 30 to 50 wt %. The water content is from usually 20 to 200 parts by weight, preferably 30 to 150 parts by weight, more preferably 40 to 100 parts by weight, based on 100 parts of EVOH-based resin.

The unduly high alcohol content and high water content tend to lower the efficiency of containing in the boric acid compound-containing treatment which is subsequently carried out. Unduly low alcohol content and low water content increase the viscosity, as a result, the efficiency of substituting at the latter part of the tower type container is lowered and discharge from the container tends to become difficult.

The water/alcohol ratio in the EVOH-based resin hydrous paste (I) is usually (1/99)-(80/20), preferably (10/90)-(75/25), more preferably (30/70)-(70/30) in terms of weight ratio of (water/alcohol).

If the alcohol content is too high, polarity of the solution becomes too low, which results in a tendency of lowering compatibility with EVOH-based resin. If the alcohol content is too low, polarity of the solution becomes too high, which results in a tendency of lowering compatibility with EVOH-based resin.

(2) Boric Acid Compound-Containing Treatment (Preparation of Boric Acid Compound-Containing EVOH-Based Resin Paste (II))

Boric acid compound-containing EVOH-based resin paste (II) may be prepared by allowing the EVOH-based resin hydrous paste (I) prepared above to contain a boric acid compound.

Since the EVOH-based resin hydrous paste (I) does not contain a boric acid compound, addition of boric acid compound to the EVOH-based resin hydrous paste (I) is needed. The treatment for containing boric acid compound is possible to be carried out in parallel with the tetracoordination treatment. However, in general, it is difficult to add a boric acid compound in a process of tetracoordination treatment at an amount such as to meet with a concentration of the boric acid that corresponds to the concentration of the boric acid compound in a resulting EVOH-based resin composition. Addition of such amount of boric acid compound also causes to lower the efficiency of conversion to tetracoordinated boron. Accordingly it is preferable to contain the boric acid compound to some extent in the concentration prior to the tetracoordination treatment.

The method of containing a boric acid compound is not limited, however, an ordinary method is to contact the aqueous solution of boric acid compound (hereinafter, called as "boric acid compound-containing solution") with EVOH-based resin hydrous paste (I).

The concentration of boric acid compound of the boric acid compound-containing solution is appropriately determined depending on its target concentration in a resulting EVOH-based resin composition. The amount of boric acid compound is from usually 1 to 350 ppm, more preferably 10 to 330 ppm, further more preferably 15 to 300 ppm in terms of boron based on the weight of water.

An optional additive may be added in the boric acid compound-containing solution to be used.

Examples of the additive include heat stabilizer other than alkali metal salt, antioxidant, antistatic agent, colorant, ultraviolet absorber, lubricant, plasticizer, light stabilizer, surfactant, insecticide, drying agent, antiblocking agent, fire retardant, crosslinking agent, curing agent, blowing agent, crystal forming agent, anti-fogging agent, biodegradable agent, silane coupling agent, and oxygen scavenger.

The contact may be carried out by, for example, exposing EVOH-based resin hydrous paste (I) to an aqueous solution of boric acid compound; or immersing EVOH-based resin hydrous paste (I) in an aqueous solution of boric acid compound. Contacting an EVOH-based resin hydrous paste (I) with aqueous solution of boric acid compound may also be conducted in counter flow in a tower type container for washing which is used in a preparation of the EVOH-based resin hydrous paste (I).

Thus produced boric acid compound-containing EVOH-based resin paste (II) has an alcohol content ranging from usually 10 to 200 parts by weight, preferably 20 to 150 parts by weight, more preferably 30 to 120 parts by weight based on 100 parts of EVOH-based resin, depending on a composition of boric acid compound-containing solution to be used and composition of EVOH-based resin hydrous paste (I). The content percentage of EVOH-based resin in the boric acid compound-containing EVOH-based resin paste (II) is from usually 20 to 60 wt %, preferably 30 to 50 wt %. The water content is from usually 50 to 400 parts by weight, preferably 80 to 360 parts by weight, more preferably 100 to 300 parts by weigh based on 100 parts of EVOH-based resin.

The amount of boric acid compound contained in the boric acid compound-containing EVOH-based resin paste (II) is preferably adjusted to the range of about 1 to 350 ppm, preferably 10 to 330 ppm, more preferably 30 to 300 ppm, in terms of boron per EVOH-based resin.

A concentration of 1000 to 4000 ppm in terms of alkali metal per EVOH-based resin may usually be remained.

The concentrations of boric acid compound and alkali metal salt in the boric acid compound-containing EVOH-based resin paste (II) is adjusted to the respective above-mentioned ranges, which may increase the efficiency of subsequent process of the conversion to tetracoordinated boron.

(3) Process of Tetracoordination of Boron (Preparation of Tetracoordinated Boron-Containing EVOH-Based Resin Paste (III))

The boric acid compound-containing EVOH-based resin paste (II) is contacted with a treatment liquid under an elevated temperature and pressure condition, thereby converting the boron to tetracoordinated boron. It is preferred that the concentrations of boric acid compound and alkali metal salt are adjusted to their target concentrations in an EVOH-based resin composition as a final product at the same time of carrying out of the tetracoordination treatment.

The conversion to tetracoordinated boron is achieved by contacting with boric acid compound-containing treatment liquid having a predetermined concentration of the boric acid compound in the presence of a specific amount of alkali metal salt under an elevated temperature and pressure condition. If the contact treatment is carried out under normal temperature and normal pressure, the conversion to tetracoordinated boron hardly proceeds even in the case of using boric acid compound-containing treatment liquid having a same composition. Even in the case of contacting boric acid compound-containing EVOH-based resin paste (II) with boric acid compound-containing treatment liquid under an elevated temperature and pressure condition, if the concentration of alkali metal salt is insufficient, the conversion to tetracoordinated boron hardly proceeds. Furthermore, in the case of the contact treatment with a treatment liquid under an elevated temperature and pressure condition, in particular, in the case of contact treatment with a treatment liquid under an elevated temperature and pressure condition under applying shear force, the state of the EVOH-based resin might be changed as well as the concentrations of boric acid compound and sodium are changed in the boric acid compound-containing EVOH-based resin paste (II). Accordingly the contact of acid compound-containing EVOH-based resin paste (II) with a treatment liquid is preferably carried out in the presence of alkali metal salt having an intended amount under an elevated temperature and pressure condition.

The contact treatment with treatment liquid is preferably carried out under applying shear force to boric acid compound-containing EVOH-based resin paste (II), specifically the contact treatment is preferably carried out by liquid phase kneading operation with a treatment liquid.

(3-1) Treatment Liquid

The composition of the treatment liquid is appropriately adjusted depending on a targeted composition of the EVOH-based resin composition and a composition of boric acid compound-containing EVOH-based resin paste (II) to be used. The treatment liquid used in the tetracoordination treatment is an aqueous solution used for adjusting the respective amounts of boric acid compound and alkali metal salt contained in the boric acid compound-containing EVOH-based resin paste (II) so that their concentrations meet with their targeted concentrations in a final EVOH-based resin composition.

The target composition of EVOH-based resin composition which is desired one as a final product is a composition capable of securing a stable existence of tetracoordinated boron. The target composition is that the content of the boric acid compound is in the range of preferably 1 to 350 ppm, more preferably 10 to 330 ppm, further more preferably 30 to 300 ppm in terms of boron per EVOH-based resin. The amount of the alkali metal contained in the EVOH-based resin composition is from preferably 300 ppm or more, more preferably 300 to 1000 ppm, further more preferably 310 to 1000 ppm, particularly preferably 320 to 800 ppm in terms of metal per EVOH-based resin.

Accordingly in the case of using the boric acid compound-containing EVOH-based resin paste (II), boric acid compound is contained in the treatment liquid used in the contact treatment at an amount of preferably 1 to 50 ppm, more preferably 5 to 40 ppm, further more preferably 10 to 30 ppm in terms of boron per water in the treatment liquid.

The treatment liquid preferably contains a salt of alkali metal such as sodium. This is because that the crosslinked structure by boric acid is affected by alkali metal salt, and tetracoordination treatment of boron needs to be carried out in the presence of 300 ppm or more of alkali metal salt. If the amount of alkali metal salt contained in the boric acid compound-containing EVOH-based resin paste (II) to be supplied to the tetracoordination treatment is too low, conversion to tetracoordinated boron is hard to occur. In the case of using the treatment liquid having too low content of alkali metal salt, alkali metal salt is eluted from the boric acid compound-containing EVOH-based resin paste (II) during liquid phase kneading operation, and therefore tricoordinated boron has a difficulty in conversion to tetracoordinated boron. In the case of using a treatment liquid having too high content of alkali metal salt, the amount of alkali metal salt contained in the boric acid compound-containing EVOH-based resin paste (II) is increased, as a result, the quality of EVOH-based resin composition as a final product is impaired such as coloration of the EVOH-based resin composition.

Accordingly in the case of using the boric acid compound-containing EVOH-based resin paste (II), the amount of alkali metal salt contained in the treatment liquid is in the range of preferably 50 to 1500 ppm, more preferably 70 to 1200 ppm, further preferably 100 to 1000 ppm, in terms of metal per water contained in the treatment liquid.

In the case of adding carboxylic acid, a treatment liquid is preferably employed so that the content of carboxylic acid in the tetracoordinated boron-containing EVOH-based resin paste (III) obtained by the treatment is in the range of usually 10 to 10000 ppm, preferably 50 to 3000 ppm, further preferably 100 to 2000 ppm, per EVOH-based resin in the paste (III). If the content of carboxylic acid is too low, an insufficient effect by the carboxylic acid tends to be obtained. The unduly high content of the carboxylic acid has a tendency of a difficulty in a production of a homogenous film. For these reasons, the amount of carboxylic acid contained in the treatment liquid is in the range of usually 10 to 3000 ppm, preferably 20 to 1000 ppm, further preferably 30 to 500 ppm.

In the case of adding a phosphoric acid compound, the amount of the phosphoric acid compound contained in the tetracoordinated boron-containing EVOH-based resin paste (III) obtained by the treatment is in the range of 1 to 1000 ppm in the terms of phosphoric acid root per the EVOH-based resin paste, in accordance with an ion chromatography analysis. Unduly low content of the phosphoric acid compound causes coloration of a molded product. Unduly high content of the phosphoric acid compound causes the occurrence of gel and fish eye in a molded product. Accordingly the amount of the phosphoric acid compound contained in the treatment liquid is in the range of usually 1 to 3000 ppm, preferably 10 to 1000 ppm, more preferably 20 to 500 ppm.

(3-2) Condition of Tetracoordination Treatment

The contact with the treatment liquid for tetracoordination is carried out under an elevated temperature and pressure condition. Further, the contact is preferably carried out under applying shear force.

When it comes to the contact treatment with the boric-acid compound-containing EVOH-based resin paste (II) with the treatment liquid under an elevated temperature and pressure condition, both the continuous treatment and the batch treatment can be adopted, but from the viewpoint of production efficiency, the continuous treatment is preferred.

As the continuous treatment method, there are methods like shown below: a method of continuously supplying and exposing the treatment liquid to the boric-acid compound-containing EVOH-based resin paste (II); a method of continuously introducing a boric-acid compound-containing EVOH-based resin paste (II) into a treatment liquid in a container; a method of introducing both treatment liquid and boric-acid compound-containing EVOH-based resin paste (II) into a container.

Concretely speaking, with use of a container in which inlet for introducing paste, outlet for exhausting paste, inlet for charging water used for washing, and outlet of exhausting used water are opened at appropriate positions respectively, continuously contacting the boric acid compound-containing EVOH-based resin paste (II) with the treatment liquid is preferably achieved. A horizontal type of washing apparatus is preferably employed from the viewpoint of productivity.

The temperature in the container used for the contact treatment is set in the range of usually 50 to 150° C., preferably 60 to 140° C., more preferably 70 to 130° C. Unduly high temperature causes thermal deterioration of the resin, as a result, EVOH-based resin tends to be colored. Unduly low temperature increases the viscosity, which causes unsatisfactory handleability.

The temperature of boric acid compound-containing EVOH-based resin paste (II) to be introduced is set in the range of usually 50 to 120° C., preferably 60 to 120° C.

The pressurized pressure in the container is set so that the difference between the pressure in the container and atmospheric pressure is in the range of usually 0.01 to 1 MPaG, preferably 0.05 to 0.5 MPaG, more preferably 0.1 to 0.3 MPaG. If the pressure in the container is too high, the facility tends to be difficult in maintaining air tightness state. If the pressure in the container is too low, water present in the container may be boiled.

The contact between the paste introduced and the treatment liquid for adjusting concentration can be carried out in either counter flow or parallel flow, but from the viewpoint of substitution efficiency, the contact is preferably carried out in counter flow.

Tetracoordinated boron-containing EVOH-based resin paste (III) having intended amounts of alkali metal salt and boric acid compound, and containing boron at least a part of which is present in tetracoordinated structure, comes out from the outlet for exhausting paste.

(3-3) Contact Treatment

The contact between the treatment liquid and boric acid compound-containing EVOH-based resin paste (II) in the contact treatment is preferably carried out under applying shear force. According to a preferable embodiment, shear force is applied to the boric acid compound-containing EVOH-based resin paste (II) in the treatment liquid. Hereinafter this operation is sometimes called as liquid phase kneading operation.

The liquid phase kneading operation is a process in which a new surface of the boric acid compound-containing EVOH-based resin paste (II) can appear by being kneaded with a screw or the like while the treatment liquid is continuously supplied, and thereby achieving the homogenous contact between the internal EVOH-based resin paste (II) and the treatment liquid.

The liquid phase kneading operation is performed with use of a container equipped with a kneader for applying shear to the paste. The container may be employed among the above-mentioned containers. When it comes to the container equipped with a kneader, a horizontal type one is preferred from the viewpoint of productivity.

As the kneader, there is a kneader having a screw, gear, and paddle and so on. A shear force to the paste is preferably applied by the kneader in a vertical direction to a stream line of the paste in the container. A preferable kneader is equipped with a jacket, a coil, and a screw axis with a temperature control means such as an incorporation of heater. In a particular case of employing a horizontal type container, since a preferable flow direction of the paste is horizontal direction in productivity, the shear force preferably applies to the paste in vertical direction to the paste.

As a kneading apparatus, besides a biaxial type kneader, double arm type kneader, co-kneader, and votator type kneader may be employed. In addition, ribbon form, screw form, paddle form, muller form, or emission rod form, as well as a pin mixer, cutter mixer, a rod mixer, internal mixer, or a like mixer, and a ball rod mill, pug mill, and horizontal mono- or bi-axial kneading apparatus may be employed.

A container equipped with a large clearance type kneader which has a bigger gap (clearance) was established between a screw and the tank body of the container than a general kneader (mixing machine) is preferred. A "large clearance type kneader" is more preferred. The large clearance type kneader can perform a liquid phase kneading operation where boric acid compound-containing EVOH-based resin paste (II) is kneaded in the treatment liquid introduced from the inlet for washing water and kneading is performed by rotation of screw in the treatment liquid with applying shear force to the boric acid compound-containing EVOH-based resin paste (II). Thus liquid phase kneading operation can achieve to get the treatment liquid to contact the paste inside effectively.

"The clearance" is a closest distance between the forefront of the wing of the screw and the inner wall of the container. The clearance is set in the range of usually 1 to 20 mm, preferably 5 to 15 mm, more preferably 5 to 10 mm. Unduly wide clearance tends to lower the efficiency of appearing a new surface. Unduly narrow clearance tends to lower the efficiency of transferring the paste. A typical kneader may be employed but the contact opportunity with the treatment liquid is decreased to some extent.

In the boric acid compound-containing EVOH-based resin paste (II) which is supplied to the container, a bath ratio, which is a ratio of quantity of treatment liquid to quantity of EVOH-based resin to be fed, i.e. quantity of treatment liquid/quantity of EVOH-based resin to be fed, is usually 0.5 to 10, preferably 1 to 8, more preferably 3 to 5. Unduly high ratio tends to be lowered in economic efficiency. Unduly low ratio tends to lower the efficiency of conversion rate of tetracoordination.

Residence time of paste in the container is usually from 0.5 to 10 hours, preferably 1 to 8 hours, more preferably 1 to 5 hours, depending on a property desired for EVOH-based resin. If the contact time with treatment liquid is too long, or if the state of liquid phase kneading is kept for a long time, a carboxyl group (—COOH) at the end of the polymeric chain of EVOH-based resin reacts with a hydroxyl group near the carboxyl group to form a lactone, which causes to lower to retain the alkali metal salt by the carboxyl group. As a result, the concentration of alkali metal salt necessary for tetracoordination cannot be secured. For example, a boron which is converted to tetracoordinated structure may return to a tricoordinate structure again.

The amount of boric acid compound-containing EVOH-based resin paste (II) introduced into a washing tank is usually 10 to 90% per hour, preferably 10 to 50% per hour, more preferably 10 to 25 volume % per hour, depending on the bath ratio, wherein % indicates % by volume based on the inner volume of horizontal type washing tank. Unduly low amount tends to lower the efficiency of tetracoordination. Unduly high amount causes an unsatisfactory conversion to tetracoordination.

The residence time of water used as the treatment liquid is set to the range of usually 0.5 to 20 hours, preferably 0.5 to 15 hours.

As described above, at least a part of boron in the boric acid compound contained in the EVOH-based resin composition can be converted to the tetracoordinated structure. The tetracoordinated boron-containing EVOH-based resin paste (III) thus obtained, becomes a paste with an increased viscosity by the tetracoordinated boron. Among the boron contained in the EVOH-based resin composition, the proportion of boron having the tetracoordinated structure depends on the boric acid compound-containing EVOH-based resin paste (II) to be used, and the conditions of tetracoordination treatment (composition of treatment liquid, elevated temperature/pressure conditions, conditions of liquid phase kneading operation, treating time, etc.). However, usually 10 to 95 wt % of boron, preferably 20 to 90 wt % of boron can be converted to tetracoordinated boron.

The tetracoordinated boron-containing EVOH-based resin paste (III) usually has a resin content of 40 to 70% by weight. The amount of alcohol contained in the tetracoordinated boron-containing EVOH-based resin paste (III) is usually from 0 to 5 parts by weight, and the amount of water is usually 40 to 100 parts by weight, both based on 100 parts by weight of EVOH-based resin. The amount of acetic acid per the EVOH-based resin is usually from 500 to 3000 ppm, preferably 800 to 2000 ppm. The amount of boric acid compound per the EVOH-based resin is usually from 1 to 350 ppm, preferably 30 to 300 ppm in terms of boron. The amount of alkali metal salt per the EVOH-based resin is usually 300 to 1000 ppm, preferably 320 to 800 ppm in terms of alkali metal.

(4) Pelletizing

A pelletization of the tetracoordinated boron-containing EVOH-based resin paste (III) is performed preferably by the methods below, but not limited thereto.

Examples of the pelletizations include a method of extruding tetracoordinated boron-containing EVOH-based resin paste (III) through a hole or slit, and cutting the extrudate to form pellets (e.g. hot-cut pelletization and underwater cut pelletization); and a method of extruding the tetracoordinated boron-containing EVOH-based resin paste (III) in a form of sheet or strand, cooling and solidifying the extrudate and cutting the obtained sheet or strand to produce pellets. Thus produced pellets are dried by a conventional known method for drying.

The pellet shape is not particularly limited. The pellet may have a shape such as sphere, column, cube, cuboid, plate like shape. The shape of the pellet usually depends on the pelletizing process. The pellet size is chosen from the range of usually 1 to 6 mm, preferably 2 to 5 mm in diameter, and the range of usually 1 to 6 mm, preferably 2 to 5 mm in height, from the viewpoint of convenience in the case of using for a molding material.

Thus obtained pellet of EVOH-based resin composition contains from 10 to 95% by mol of a boric acid compound having tetracoordinated boron based on the whole amount of boric acid compound contained therein.

This means that the EVOH-based resin pellet produced by the method of the invention has a higher tensile viscosity than a conventional pellet of EVOH-based resin composition containing a boric acid compound in a same concentration despite that the amount of boric acid compound of the former pellet is reduced as compared with the latter pellet.

The tensile viscosity predominates a flow behavior of the resin in a place where the flow rate of the resin is increased or decreased, such as a narrow gate of flow passage and a joining part of multilayers. Accordingly the tensile viscosity may be employed as an indicator for evaluating moldability level which is hard to be evaluated by a conventional evaluation method in accordance with melt viscosity.

Concretely speaking, in the case that the amount of boric acid compound is from 1 to 350 ppm in terms of boron per the EVOH-based resin, the tensile viscosity of the resin composition is from about $1.0 \times 10^2$ to about $1.0 \times 10^6$ Pa·s, at a typical condition of film formation, that is, 210° C. and tensile distorted speed of 100 $\sec^{-1}$.

According to the producing method of the invention, a further rinsing and drying operation for pellets are not needed because the concentration of boric acid compound is already adjusted.

EXAMPLE

The invention will be specifically explained with examples below, but these examples do not restrict the invention as long as it does not exceed the gist of the invention.

The term "parts" in Examples is on the basis of weight unless otherwise indicated. The unit "MPaG" is a unit in gauge level and indicates a difference between absolute pressure and atmospheric pressure.

[Measurement and Evaluation Method]

(1) Amount of Boric Acid Compound Contained in EVOH-Based Resin Composition (in Terms of Boron)

0.1 g of EVOH-based resin composition (pellet) together with concentrated nitric acid was subjected to a microwave analysis and then the resulting solution was adjusted to a predetermined concentration (0.75 mg/ml) by adding pure water. Thus prepared solution having a predetermined concentration was used for an analyte solution, which was provided for a measurement by ICP emission spectroscopic analysis (ICP-AES) with a measuring instrument (720-ES type from Agilent Technologies). The boron to be measured in quantity by this method corresponds to boron derived from the boric acid compound.

(2) Percentage of Tetracoordinated Boron in Boric Acid Compound

The structure of boron nucleus was analyzed with solid NMR. A sample to be analyzed was finely crushed by a frozen crush in liquid nitrogen atmosphere and filled in a zirconia rotor having outer diameter of 4 mm. The measurement was conducted at room temperature under the following conditions in accordance with pulse sequence shown in FIG. 3.

The obtained spectrum was shown in FIG. 4. The 2-dimensional spectrum of boric acid compound contained in EVOH-based resin proved that there were a boron having tricoordinated structure and a boron having tetracoordinated structure as the boron contained in the boric acid compound. The one-dimensional spectrum in the upper part is a spectrum of the MAS axis and the spectrum surrounded in a square in a left-side is an equal axis spectrum. The equal axis spectrum was separated into tricoordinated boron and tetracoordinated boron in a wave pattern by a gauss function, and the percentage of the tetracoordinated boron was calculated based on the respective areas by the following equation.

$$\text{percentage of tetracoordinated boron (mol\%)} = \frac{\text{Area of tetracoordinated boron}}{\text{Area of tricoordinated boron} + \text{Area of tetracoordinated boron}} \times 100 \quad \text{[Equation 1]}$$

Method: MQMAS(3QMAS)

$^{11}$B ($B_0$=128 MHz; I=3/2)

Observed nucleus type (major parameters)

$^{11}$B pulse HP1: 4.15 μs, HP2: 1.38 μs, SP1: 30.00 μs

FID signal imported time: 10 ms

Decup sequence: tppm15

Cumulated number (xFID): 840×12

Center of observation: 0 ppm

Observation width: 232 ppm

Waiting time: 5 sec (3) Amount of Sodium Contained in EVOH-Based Resin Composition EVOH-based resin solution including solvent was dried, and thereafter sulfuric acid was added. After thus obtained solution was carbonized and incinerated. The resultant was dissolved by heating with nitric acid and the obtained liquid was provided to the analysis concerning the amount of sodium contained in the liquid by atomic absorption spectrometry with an atomic absorption spectrophotometer (Z-5310 from Hitachi Ltd.).

(4) Tensile Viscosity (Pa·s)

A barrel was filled with approximately 35 g of pellets and preheated at 210° C. for 5 minutes. A molten resin was extruded from the barrel and measured with respect to tensile viscosity at 100 sec$^{-1}$ in tensile distortion speed.

A twin capillary rheometer "RG20" from GOTTFERT was used for the measurement of tensile viscosity.

Example 1

(1) Synthesis of EVOH-Based Resin

To a polymerization container having a cooling coil, 420 parts by weight of vinyl acetate, 90 parts by weight of methanol, 180 ppm of acetyl peroxide (relative to vinyl acetate) were fed, and gas in the container was replaced with nitrogen gas. Subsequently inside of the container was replaced with ethylene and subsequently ethylene was fed up to 4.7 MPaG in the pressure of ethylene.

Thereafter, the temperature in the container was elevated to 67° C. with agitation to initiate the copolymerization of vinyl acetate and ethylene. Six hours later, the polymerization reaction was terminated. The rate of polymerization of vinyl acetate was 63% by weight based on the amount of vinyl acetate which was fed in the container. The obtained ethylene-vinyl acetate copolymer had 38 mol % in a content of ethylene-derived unit. A solution of the ethylene-vinyl acetate copolymer was fed to distillation tower and gaseous methanol was introduced into the tower from the lower portion, unreacted vinyl acetate was removed, and thus methanol solution of ethylene-vinyl acetate copolymer (resin content of 48 wt %) was obtained.

This methanol solution of ethylene-vinyl acetate copolymer was supplied to a shelf plate tower from the upper portion thereof at a rate of 30 parts by weight per hour, and methanol was supplied from the lower portion thereof at a rate of 60 parts by weight per hour. Saponification was carried out by feeding a methanol solution containing sodium hydroxide from the upper portion of the tower, at 6 mmol equivalent amount relative to acetyl group of the ethylene-vinyl acetate copolymer at the same time. The obtained methanol solution of saponified ethylene-vinyl acetate copolymer (EVOH-based resin) was discharged from the bottom of the tower. Thus produced EVOH-based resin has 38 mol % in a content of ethylene-derived unit and 99.7 mol % in saponification degree. The temperature in the tower was in the range of 100 to 105° C. and the pressure in the tower was 0.25 MPaG.

(2) Preparation of EVOH-Based Resin Hydrous Paste (I)

The obtained methanol solution of EVOH-based resin was supplied, at 80 parts by weight per hour, to the second shelf plate from the top of the tower type container for washing which has 10 shelves. Steam having a temperature of 130° C. was continuously supplied to the container from the lowest shelf plate at 20 parts by weight per hour. The contact between the methanol solution of EVOH-based resin and steam was performed in counter flow in the shelf plate tower. An EVOH-based resin hydrous paste (I) was discharged from the outlet for paste which was placed at the bottom of the tower type container for washing. When the EVOH-based resin was subjected to hydration treatment, the temperature in the tower type container for washing was in the range of 100 to 105° C. and the pressure in the container was 0.15 MPaG.

Thus prepared EVOH-based resin hydrous paste (I) contains 92 parts by weight of methanol and 40 parts by weight of water based on 100 parts by weight of EVOH-based resin. The content of EVOH-based resin was 43% by weight based on the whole of hydrous paste (I). The EVOH-based resin hydrous paste contains 3460 ppm of sodium acetate therein, which corresponds to 8050 ppm of sodium acetate relative to EVOH-based resin.

(3) Treatment for Containing Boric Acid (Preparation of Boric Acid Compound-Containing EVOH-Based Resin Paste (II))

An aqueous solution containing 1200 ppm of boric acid and 3000 ppm acetic acid was added to EVOH-based resin hydrous paste (I) to prepare boric acid compound-containing EVOH-based resin paste (II) by use of line mixer.

The obtained boric acid compound-containing EVOH-based resin paste (II) had a resin content of 24 wt %, and contained 92 parts by weight of methanol and 220 parts by weight of water based on 100 parts by weight of the EVOH-based resin. The boric acid compound-containing EVOH-based resin paste (II) contained 3000 ppm of acetic acid, 8050 ppm of sodium acetate, and 1200 ppm of boric acid (210 ppm in terms of boron), all based on the EVOH-based resin content.

(4) Tetracoordination Treatment of Boron (Preparation of Tetracoordinated Boron-Containing EVOH-Based Resin Paste (III))

The boric acid compound-containing EVOH-based resin paste (II) was supplied from the upstream side of a horizontal type container equipped with a kneader and a treatment liquid having a composition described below was supplied to the container from the downstream side, thereby carrying out the contact treatment with the treatment liquid.

A) Conditions of horizontal type container equipped with a kneader
  Rotational frequency of screw: 60 rpm
  Clearance between screw and inner wall of tank: 8 mm
  Temperature in the tank (water temperature in front of vent): 120° C.

B) Composition of treatment liquid (amount relative to water)
  acetic acid: 230 ppm
  sodium acetate: 400 ppm
  boric acid: 122 ppm (21 ppm in terms of boron)
  sodium dihydrogen phosphate: 190 ppm
  calcium phosphate: 28 ppm C) Conditions of Contact Treatment
  Amount of introduced EVOH-based resin paste (II): 26 parts by weight per hour
  Temperature of EVOH-based resin paste (II) when introducing: 80° C.
  Residence time of EVOH-based resin paste (II): 4 hours
  Supplied amount of treatment liquid: 30 parts by weight per hour
  Discharge amount: 10 parts by weight per hour
  Pressure: 0.20 MPaG
  Bath ratio
    (weight of treatment liquid/supplied amount of EVOH-based resin): 4.8

By the liquid phase kneading operation with the treatment liquid, methanol was washed away and tetracoordinated boron-containing EVOH-based resin paste (III), which was clouded EVOH-based resin hydrous paste having an increased viscosity due to the tetracoordination of boron, was discharged from the washing tank.

The tetracoordinated boron-containing EVOH-based resin paste (III) had a content of EVOH-based resin of 60% by weight, and contained 67 parts by weight of water and 0 parts by weight of methanol based on 100 parts by weight of the EVOH-based resin. Also the tetracoordinated boron-containing EVOH-based resin paste (III) contained 1220 ppm of acetic acid, 1546 ppm of boric acid (270 ppm in terms of boron), 435 ppm of sodium, 55 ppm of phosphoric acid, and 8 ppm of calcium, all based on the EVOH-based resin.

(5) Pelletization

Thus obtained tetracoordinated boron-containing EVOH-based resin paste (III) was melt-extruded through a slit, cooled and solidified to obtain a sheet of the EVOH-based resin paste. This sheet was cut into a strip and dried to obtain EVOH-based resin pellet.

Thus obtained pellet was measured with respect to tensile viscosity and coordination structure of boron in accordance with the above method. The results were shown in Table 1.

Comparative Example 1

(1) Preparation of Boric Acid Compound-Containing EVOH-Based Resin Paste (II)

An EVOH-based resin was synthesized in the same manner as Example 1 and an EVOH-based resin hydrous paste (I) was prepared.

A water/methanol mixed solution having a weight ratio of water/methanol=30/70, and containing boric acid (1200 ppm) and acetic acid (3000 ppm) were added to the EVOH-based resin hydrous paste (I) to prepare boric acid compound-containing EVOH-based resin paste (II') with use of line mixer.

The obtained boric acid compound-containing EVOH-based resin paste (II') had a resin content of 42 wt %, and contained 95 parts by weight of methanol and 41 parts by weight of water, both based on 100 parts by weight of the EVOH-based resin. The boric acid compound-containing EVOH-based resin paste (II') also contained 3000 ppm of acetic acid, 8050 ppm of sodium acetate, 1200 ppm of boric acid (210 ppm in terms of boron), wherein all ingredients were based on the weight of the EVOH-based resin.

(2) Pelletization

The boric acid compound-containing EVOH-based resin paste (II') having an adjusted water content was extruded, in a strand form, into a cooling water having a temperature of 5° C., and cut the strand-shaped extrudate to obtain EVOH-based resin pellets.

(3) Washing Treatment

Thus produced EVOH-based resin pellet was supplied to a tower type of washing tank from upper portion under the conditions shown below, and was subjected to a washing treatment with use of a washing liquid having the same composition as Example 1 under the conditions shown below. The produced pellets were continuously drawn out from the bottom of the washing tank.

A) Conditions of the Washing Tank
  No agitation
  Temperature in the tower (water temperature in front of vent): 30° C.

B) Composition of Washing Liquid (Content Relative to Water)
  Similar to Example 1
C) Conditions of Washing Treatment
  Supplied amount of EVOH-based resin pellet: 12 parts by weight per hour
  Temperature of supplied EVOH-based resin pellet: 30° C.
  Residence time of EVOH-based resin pellet: 4 hours
  Supplied amount of washing liquid: 24 parts by weight per hour
  Produced amount of pellet: 12 parts by weight per hour
  Pressure: normal pressure
  Bath ratio
    (weight of water for rinsing/supplied amount of EVOH-based resin): 4.8
  The pellet after washing treatment had a content of EVOH-based resin of 60% by weight, and contained 67 parts by weight of water, 0 parts by weight of methanol, 2400 ppm of acetic acid, 1546 ppm of boric acid (270 ppm in terms of boron), 210 ppm of sodium, 110 ppm of phosphoric acid, and 10 ppm of calcium, all ingredients based on 100 parts by weight of EVOH-based resin.
  EVOH-based resin pellet after washing treatment was carried out was dried and measured with respect to tensile viscosity and coordination structure of boron. The results are shown in Table 1.

Comparative Example 2

(1) Preparation of Boron-Containing EVOH-Based Resin Paste (II)
  An EVOH-based resin was synthesized and EVOH-based resin hydrous paste (I) was prepared in the same manner as Example 1. The prepared EVOH-based resin hydrous paste (I) was subjected to the treatment for containing boric acid to produce the same boric acid compound-containing EVOH-based resin paste (II) as Example 1.
(2) Washing Treatment
  The boric acid compound-containing EVOH-based resin paste (II) was supplied to a horizontal type washing tank from upstream side and a washing liquid having a composition shown below was supplied to the tank from downstream side thereof, and thereby performing a washing treatment by liquid phase kneading operation.

A) Conditions of Washing Tank
  Rotational frequency of screw: 60 rpm
  Clearance between screw and inner wall of tank: 8 mm
  Temperature in the tank (water temperature in front of valve): 120° C.
B) Composition of Washing Solution (Content Relative to Water)
  Similar to Example 1
C) Conditions of Washing Treatment
  Supplied amount of EVOH-based resin paste: 26 parts by weight per hour
  Temperature of EVOH-based resin paste when supplying: 120° C.
  Residence time of EVOH-based resin paste: 16 hours
  Supplied amount of washing liquid: 30 parts by weight per hour
  Produced amount: 10 parts by weight per hour
  Pressure: 0.2 MPa
  Bath Ratio
    (weight of washing liquid/supplied amount of EVOH-based resin): 4.8
  By the liquid phase kneading operation with the treatment liquid, methanol and boric acid were washed away and boric acid compound-containing EVOH-based resin paste (II"), which was clouded and had an increased viscosity, was discharged from the washing tank.
  This boric acid compound-containing EVOH-based resin paste (II") had a content of EVOH-based resin of 60% by weight, and contained 67 parts by weight of water and 0 parts by weight of methanol, both based on 100 parts by weight of the EVOH-based resin. The boric acid compound-containing EVOH-based resin paste (II") also contained 580 ppm of acetic acid, 1290 ppm of boric acid (225 ppm in terms of boron), 105 ppm of sodium, 56 ppm of phosphoric acid, and 11 ppm of calcium, wherein all ingredients were based on the EVOH-based resin.
(3) Pelletization
  The boric acid compound-containing EVOH-based resin paste (II") after the washing treatment was pelletized in the same manner as Example 1 and thereby obtaining EVOH-based resin pellet in a form of strip.
  Thus obtained pellet was measured with respect to tensile viscosity and coordination structure of boron in accordance with the above-mentioned method. The results were shown in Table 1.

TABLE 1

| | | Example 1 | Comparative Example 1 | Comparative Example 2 |
|---|---|---|---|---|
| Boric acid-containing EVOH-based resin paste (II) | EVOH resin (wt %) | 24 | 42 | 24 |
| | Water/EVOH 100 parts | 220 | 220 | 220 |
| | Methanol/EVOH 100 parts | 95 | 95 | 95 |
| | Acetic acid | 3000 | 3000 | 3000 |
| | Na acetate/EVOH resin (ppm) | 8050 | 8050 | 8050 |
| | In terms of metal (ppm) | 2260 | 2260 | 2260 |
| | Boric acid/EVOH resin (in terms of boron, ppm) | 210 | 210 | 210 |
| Treatment | Temperature in container (° C.) | 120 | 30 | 120 |
| | Pressurized force (MPaG) | 0.20 | Normal pressure | 0.20 |
| | Treating time (hr) | 4 | 4 | 16 |
| | Type | Paste LPKO*1 | Pellet WRW*2 | Paste LPKO*1 |
| Treatment liquid (washing liquid) | Na/water (ppm) | 150 | 150 | 150 |
| | Boric acid/water (in terms of boron, ppm) | 21 | 21 | 21 |

TABLE 1-continued

|  |  | Example 1 | Comparative Example 1 | Comparative Example 2 |
|---|---|---|---|---|
| Composition of EVOH-based resin pellet | EVOH resin (wt %) | 60 | 42 | 60 |
|  | Acetic acid/EVOH resin | 1220 | 2400 | 580 |
|  | Na/EVOH resin (ppm) | 435 | 210 | 105 |
|  | Boron/EVOH resin (ppm) | 270 | 270 | 225 |
|  | Na/boron | 1.61 | 0.78 | 0.47 |
| Character | Percentage of tetracoordinated boron (mol %) (per boron in boric acid compound) | 83 | 0 | 0 |
|  | Tensile viscosity (Pa · s) | $1.4 \times 10^4$ | $8.9 \times 10^3$ | — |

*[1]LPKO Liquid phase kneading operation
*[2]WRW Washing with running water

As understood from Table 1, Example 1 where liquid phase kneading operation under an elevated temperature and pressure condition was carried out as a process for adjusting the concentration of boric acid, boron was converted to tetracoordinated structure and the obtained EVOH-based resin pellet had a relatively high tensile viscosity.

On the other hand, in Comparative Example 1 which employed a conventional washing treatment for EVOH-based resin pellet, boron was not converted to tetracoordinated structure and the tensile viscosity of the obtained EVOH-based resin pellet was about 60% based on that of Example 1 despite of using the washing solution having the same composition as that of Example 1.

In Comparative Example 2, although the liquid phase kneading operation of boric acid compound-containing EVOH-based resin paste (II) was performed under an elevated temperature and pressure condition, boron was not converted to tetracoordinated structure due to excessively low content of sodium. For these results, the coexistence of a proper amount of sodium was effective for conversion to tetracoordinated boron.

The washing liquid used in Comparative Example 2 had the same composition as that of Example 1, however, it was supposed that the amount of sodium contained was reduced due to unduly long treating time and thereby occurring the recovery to tricoordinated structure.

INDUSTRIAL APPLICABILITY

In the producing method of the invention, both of adjustment of the amount of boric acid compound contained in the EVOH-based resin composition and conversion of boron in the boric acid compound to tetracoordinated structure may be achieved during the washing treatment of the composition. Paste or pellet of EVOH-based resin composition containing tetracoordinated boron is excellent in mold processability despite of a reduced amount of boric acid compound. Moreover the paste or pellet is allowed to reduce the number of repetition operation of washing and drying for adjusting the concentrations in the pellet and therefore they are useful in improvement of productivity and quality of EVOH-based resin pellet.

The invention claimed is:

1. A resin composition comprising a saponified ethylene-vinyl ester-based copolymer and a boric acid,
    wherein the resin composition contains tetracoordinated boron, and
    wherein a percentage of the tetracoordinated boron in the boric acid is from 10 to 99% by mol based on the boric acid.

2. The resin composition according to claim 1, wherein the amount of the boric acid is in the range of 1 to 350 ppm in terms of boron based on the saponified ethylene-vinyl ester-based copolymer.

3. The resin composition according to claim 1, further comprising 300 to 1000 ppm of an alkali metal salt in terms of metal per the saponified ethylene-vinyl ester-based copolymer.

4. The resin composition according to claim 3, wherein the alkali metal salt is a sodium salt.

5. The resin composition according to claim 3, wherein the amount of the alkali metal salt per the boric acid is an amount such that a ratio in weight of alkali metal salt in terms of alkali metal to the boric acid compound in terms of boron is from 0.8 to 10.

6. The resin composition according to claim 1, wherein a tensile viscosity at a tensile strain rate of 100 $sec^{-1}$ at 210° C. is in the range of $1.0 \times 10^2$ to $1.0 \times 10^6$ Pa·s.

7. A method for producing a saponified ethylene-vinyl ester-based copolymer composition containing tetracoordinated boron comprising,
    contacting a saponified ethylene-vinyl ester-based copolymer paste comprising a first boric acid compound with an aqueous solution containing a second boric acid compound and an alkali metal salt under an elevated temperature and pressure condition to convert at least a part of boron in the first boric acid compound contained in the paste to tetracoordinated boron,
    wherein the aqueous solution contains the second boric acid compound and an alkali metal salt at respective content such that the resulting total content of the first boric acid compound and the second boric acid compound is from 1 to 350 ppm in terms of boron per saponified ethylene-vinyl ester-based copolymer in the saponified ethylene-vinyl ester-based copolymer composition and the content of the alkali metal salt is from 300 to 1000 ppm in terms of metal per saponified ethylene-vinyl ester-based copolymer in the saponified ethylene-vinyl ester-based copolymer composition.

8. The producing method according to claim 7, wherein the conversion process is carried out in a system having a temperature of 50 to 150° C. and a pressure of 0.01 to 1 MPaG as a difference between a pressure in the system and air pressure.

9. The producing method according to claim 7, wherein the contact is carried out with kneading the saponified ethylene-vinyl ester-based copolymer paste with the aqueous solution.

10. The producing method according to claim 7, wherein the saponified ethylene-vinyl ester-based copolymer paste contains 1 to 350 ppm of the first boric acid compound in terms of boron per the saponified ethylene-vinyl ester-based copolymer, and contains 1000 to 4000 ppm of the alkali metal salt in terms of metal per the saponified ethylene-vinyl ester-based copolymer.

11. The producing method according to claim 7, wherein the aqueous solution
   contains the second boric acid compound in a concentration of 1 to 50 ppm in terms of boron, and
   contains the alkali metal salt in a concentration of 50 to 1500 ppm in terms of metal.

12. A resin composition comprising a saponified ethylene-vinyl ester-based copolymer and a boric acid,
   wherein the resin composition contains tetracoordinated boron;
   wherein the tetracoordinated boron is a result of contacting a paste comprising the saponified ethylene-vinyl ester-based copolymer comprising a first boric acid compound with an aqueous solution containing a second boric acid compound and an alkali metal salt under an elevated temperature and pressure condition to convert at least a part of boron in the first boric acid compound contained in the paste to tetracoordinated boron.

13. The resin composition according to claim 12, wherein the amount of the boric acid is in the range of 1 to 350 ppm in terms of boron based on the saponified ethylene-vinyl ester-based copolymer.

14. The resin composition according to claim 12, wherein a percentage of the tetracoordinated boron in the boric acid is from 10 to 99% by mol based on the boric acid.

15. The resin composition according to claim 12, comprising 300 to 1000 ppm of the alkali metal salt in terms of metal per the saponified ethylene-vinyl ester-based copolymer.

16. The resin composition according to claim 15, wherein the alkali metal salt is a sodium salt.

17. The resin composition according to claim 15, wherein the amount of the alkali metal salt per the boric acid is an amount such that a ratio in weight of alkali metal salt in terms of alkali metal to the boric acid compound in terms of boron is from 0.8 to 10.

18. The resin composition according to claim 12, wherein a tensile viscosity at a tensile strain rate of 100 $sec^1$ at 210° C. is in the range of $1.0 \times 10^2$ to $1.0 \times 10^6$ Pa·s.

* * * * *